United States Patent
Kojima

(10) Patent No.: US 9,967,177 B2
(45) Date of Patent: May 8, 2018

(54) CONTROL APPARATUS, COMMUNICATION SYSTEM, SWITCH CONTROL METHOD AND PROGRAM

(71) Applicant: NEC Corporation, Tokyo (JP)

(72) Inventor: Eiichirou Kojima, Tokyo (JP)

(73) Assignee: NEC Corporation, Tokyo (JP)

(*) Notice: Subject to any disclaimer, the term of this patent is extended or adjusted under 35 U.S.C. 154(b) by 160 days.

(21) Appl. No.: 14/404,573

(22) PCT Filed: May 30, 2013

(86) PCT No.: PCT/JP2013/064988
§ 371 (c)(1),
(2) Date: Nov. 28, 2014

(87) PCT Pub. No.: WO2013/180207
PCT Pub. Date: Dec. 5, 2013

(65) Prior Publication Data
US 2015/0172174 A1    Jun. 18, 2015

(30) Foreign Application Priority Data
May 31, 2012   (JP) ................. 2012-124091

(51) Int. Cl.
*H04W 4/00*     (2009.01)
*H04L 12/721*   (2013.01)
(Continued)

(52) U.S. Cl.
CPC .............. *H04L 45/38* (2013.01); *H04L 45/54* (2013.01); *H04L 45/745* (2013.01); *H04L 47/2483* (2013.01); *H04L 45/64* (2013.01)

(58) Field of Classification Search
CPC .......... H04L 45/74; H04L 69/22; H04L 45/38
(Continued)

(56) References Cited

U.S. PATENT DOCUMENTS 8,300,525 B1 * 10/2012 Kohn .................... H04L 43/022
                                                          370/230
2011/0286332 A1 * 11/2011 Mizukoshi .............. H04L 47/28
                                                          370/235
(Continued)

FOREIGN PATENT DOCUMENTS

CA       2810486 A1    3/2012
JP    2003-198607 A    7/2003
(Continued)

OTHER PUBLICATIONS

International Search Report in [PCT/JP2013/064988] dated [Jul. 23, 2013] (English Translation Thereof).
(Continued)

*Primary Examiner* — Chi H Pham
*Assistant Examiner* — Alexander O Boakye
(74) *Attorney, Agent, or Firm* — McGinn IP Law Group, PLLC

(57) ABSTRACT

A switch is provided with a function to process packets by sequentially referring to a plurality of flow tables that have priorities. A control apparatus that controls the switch is provided with an entry generation unit that generates entry information to be set in each of a first flow table having, as match conditions, predetermined item(s) among information that can be set as match conditions, and a second flow table that has, as match conditions, item(s) that are different from the first flow table, and that is referred to when an entry of the first flow table is hit; an entry operation unit that instructs the switch to update the first and second flow tables, based on the generated entry information; and an entry management unit that manages content of each flow table of the switch.

20 Claims, 12 Drawing Sheets

(51) Int. Cl.
  *H04L 12/851* (2013.01)
  *H04L 12/741* (2013.01)
  *H04L 12/715* (2013.01)

(58) Field of Classification Search
  USPC ..... 370/392, 235, 230.1, 389, 328, 390, 254
  See application file for complete search history.

(56) References Cited

U.S. PATENT DOCUMENTS

| | | | |
|---|---|---|---|
| 2011/0317701 A1 | 12/2011 | Yamato et al. | |
| 2012/0093158 A1* | 4/2012 | Chiba | H04L 45/38 370/392 |
| 2012/0314605 A1 | 12/2012 | Akiyoshi | |
| 2013/0170495 A1* | 7/2013 | Suzuki | H04L 49/3009 370/392 |
| 2013/0275592 A1* | 10/2013 | Xu | H04L 45/14 709/225 |

FOREIGN PATENT DOCUMENTS

| | | |
|---|---|---|
| JP | 2010-161473 A | 7/2010 |
| JP | 2011-170718 A | 9/2011 |
| WO | WO 2011/108205 A1 | 9/2011 |
| WO | WO 2011/118586 A1 | 9/2011 |
| WO | WO 2012/023292 A1 | 2/2012 |

OTHER PUBLICATIONS

"OpenFlow Switch Specification, Version 1.1.0. Implemented (Wire Protocol 0x02)," [online], [search carried out on Mar. 14, 2012], Internet Feburary 28, 2011. <URL:http://www.openflow.org/documents/openflow-spec-v1.1.0.pdf>.

Maeda, Feb. 23, 2012, Impress Business Media Corp.

OpenFlow Switch Specification, Version 1.2 (Wire Protocol 0x03), pp. 1-14, Dec. 5, 2011, The Open Networking Foundation.

European Search Report dated Dec. 14, 2015.

\* cited by examiner

FIG. 5

| # | MATCH CONDITIONS (MATCH FIELDS) | | | | | | PROCESSING CONTENT (INSTRUCTIONS) | |
|---|---|---|---|---|---|---|---|---|
| | INPUT PORT | VLAN_ID | TRANSMISSION SOURCE MAC ADDRESS | TRANS-MISSION SOURCE IP ADDRESS | DESTINATION MAC ADDRESS | DESTI-NATION IP ADDRESS | REWRITE VLAN_ID | OUTPUT PORT NUMBER |
| 1 | 1 | 1 | 00:00:00:00:0A:01 | 10.0.0.1 | 00:00:00:00:0B:01 | 10.0.0.2 | 2 | 4 |

FIG. 6

Table#0

| # | MATCH CONDITIONS (MATCH FIELDS) | | | | PROCESSING CONTENT (INSTRUCTIONS) |
|---|---|---|---|---|---|
|  | INPUT PORT | TRANSMISSION SOURCE MAC ADDRESS | TRANS-MISSION SOURCE IP ADDRESS | DESTINATION MAC ADDRESS | DESTINATION IP ADDRESS |  |
| 1 | 1 | 00:00:00:00:0A:01 | 10.0.0.1 | 00:00:00:00:0B:00 | 10.0.0.2 | Go-to Table#1 |

Table#1

| # | MATCH CONDITIONS (MATCH FIELDS) | PROCESSING CONTENT (INSTRUCTIONS) | |
|---|---|---|---|
|  | VLAN_ID | REWRITE VLAN_ID | OUTPUT PORT NUMBER |
| 1 | 1 | 2 | 4 |

FIG. 7

| # | MATCH CONDITIONS (MATCH FIELDS) | | | | | | PROCESSING CONTENT (INSTRUCTIONS) | |
|---|---|---|---|---|---|---|---|---|
| | IN-PUT PORT | VLAN_ID | TRANSMISSION SOURCE MAC ADDRESS | TRANS-MISSION SOURCE IP ADDRESS | DESTINATION MAC ADDRESS | DESTI-NATION IP ADDRESS | REWRITE VLAN_ID | OUTPUT PORT NUMBER |
| 1 | 1 | 1 | 00:00:00:00:0A:01 | 10.0.0.1 | 00:00:00:00:0B:00 | 10.0.0.2 | 2 | 4 |
| .. | 1 | .. | .. | 10.0.0.1 | 00:00:00:00:0B:00 | 10.0.0.2 | 2 | 4 |
| 10 | 1 | 10 | 00:00:00:00:0A:01 | 10.0.0.1 | 00:00:00:00:0B:00 | 10.0.0.2 | 2 | 4 |
| 11 | 1 | 1 | 00:00:00:00:0A:02 | 10.0.0.1 | 00:00:00:00:0B:00 | 10.0.0.2 | 2 | 4 |
| .. | 1 | .. | .. | 10.0.0.1 | 00:00:00:00:0B:00 | 10.0.0.2 | 2 | 4 |
| 99 | 1 | 9 | 00:00:00:00:0A:0A | 10.0.0.1 | 00:00:00:00:0B:00 | 10.0.0.2 | 2 | 4 |
| 100 | 1 | 10 | 00:00:00:00:0A:0A | 10.0.0.1 | 00:00:00:00:0B:00 | 10.0.0.2 | 2 | 4 |

FIG. 8

Table#0

| # | MATCH CONDITIONS (MATCH FIELDS) | | | | | PROCESSING CONTENT (INSTRUCTIONS) |
|---|---|---|---|---|---|---|
|   | IN-PUT PORT | TRANSMISSION SOURCE MAC ADDRESS | TRANS-MISSION SOURCE IP ADDRESS | DESTINATION MAC ADDRESS | DESTINATION IP ADDRESS | |
| 1 | 1 | 00:00:00:00:0A:01 | 10.0.0.1 | 00:00:00:00:0B:00 | 10.0.0.2 | Go-to Table#1 |
| : | 1 | : | 10.0.0.1 | 00:00:00:00:0B:00 | 10.0.0.2 | Go-to Table#1 |
| 10 | 1 | 00:00:00:00:0A:0A | 10.0.0.1 | 00:00:00:00:0B:00 | 10.0.0.2 | Go-to Table#1 |

Table#1

| # | MATCH CONDITIONS (MATCH FIELDS) | PROCESSING CONTENT (INSTRUCTIONS) | |
|---|---|---|---|
|   | VLAN_ID | REWRITE VLAN_ID | OUTPUT PORT NUMBER |
| 1 | 1 | 2 | 4 |
| : | : | 2 | 4 |
| 10 | 10 | 2 | 4 |

FIG. 10

MATCH CONDITIONS (MATCH FIELDS)

| Wild cards | In Port | Meta data | Ether SA | Ether DA | Ether type | VLAN ID | VLAN Priority | MPLS label | MPLS traffic class | IP src | IP dst | IP Proto / ARP opcode | IP ToS bits | TCP/ UDP/ SCTP src port / ICMP Type | TCP/ UDP/ SCTP dst port / ICMP Code | Counters | Instructions |

FIG. 11

| # | MATCH CONDITIONS (MATCH FIELDS) | | | | | | PROCESSING CONTENT (INSTRUCTIONS) | |
|---|---|---|---|---|---|---|---|---|
| | INPUT PORT | VLAN_ID | TRANSMISSION SOURCE MAC ADDRESS | TRANSMISSION SOURCE IP ADDRESS | DESTINATION MAC ADDRESS | DESTINATION IP ADDRESS | REWRITE VLAN_ID | OUTPUT PORT NUMBER |
| 1 | 1 | 10 | 00:00:00:00:00:0a | 10.0.0.1 | 00:00:00:00:00:0b | 10.0.0.2 | 20 | 5 |
| 2 | 1 | 10 | 00:00:00:00:00:0a | 10.0.0.1 | 00:00:00:00:00:0c | 10.0.0.3 | 20 | 5 |

FIG. 12

| # | MATCH CONDITIONS (MATCH FIELDS) | | | | | PROCESSING CONTENT (INSTRUCTIONS) | |
|---|---|---|---|---|---|---|---|
| | INPUT PORT | VLAN_ID | TRANSMISSION SOURCE MAC ADDRESS | TRANS- MISSION SOURCE IP ADDRESS | DESTINATION MAC ADDRESS | DESTI- NATION IP ADDRESS | REWRITE VLAN_ID | OUTPUT PORT NUMBER |
| 3 | 1 | 100 | 00:00:00:00:00:0a | 10.0.0.1 | 00:00:00:00:00:0b | 10.0.0.2 | 20 | 5 |
| 4 | 1 | 101 | 00:00:00:00:00:0a | 10.0.0.1 | 00:00:00:00:00:0b | 10.0.0.2 | 20 | 20 |

CONTROL APPARATUS, COMMUNICATION SYSTEM, SWITCH CONTROL METHOD AND PROGRAM

TECHNICAL FIELD

Cross-Reference to Related Applications

The present application claims priority from Japanese Patent Application No. JP2012-124091 (filed on May 31, 2012) the content of which is hereby incorporated in its entirety by reference into this specification. The present invention relates to a control apparatus, a communication system, a switch control method and a program, and in particular to a control apparatus, a communication system, a switch control method and a program, where switches disposed in a network are centrally controlled.

BACKGROUND

Non-Patent Literature 1 defines a specification of a switch (OpenFlow Switch; below, "OFS") in a network known as OpenFlow. In OpenFlow, a control apparatus known as an OpenFlow controller (below, "OFC") is disposed. A flow table held by an OFS contains entries (flow entries) that associate a match condition (Match Fields) which matches received packets, and processing content (Instructions) to be applied to packet(s) matching the match condition. The OFC can perform detailed control of flow units by operating on content (adding a new entry, modifying, deleting, and the like) of a flow table held by an OFS under its control.

A match condition (Match Fields) redefines, as one unit, a data range of layer 1-layer 4 in an OSI reference model defined in Ethernet (registered trademark) and TCP/IP. Specifically, a broad range of information can be set as match condition(s) (Match Fields), such as a port of a physical switch, an IEEE 802.1Q specified VLAN ID, a MAC (Media Access Control) address, an IP (Internet Protocol) address, a TCP (Transmission Control Protocol) port number, or the like, and fine grained modification of packet processing is possible.

As processing content (Instructions), a relevant packet may be forwarded to another port, or may be dropped without forwarding, for example. In OpenFlow Switch Specification Version 1.1.0 of Non-Patent Literature 1, as processing content (Instructions), it is possible to implement pipeline processing executing content of a plurality of processes using a plurality of flow tables, by setting a command (Go-to Table) instructing a transition to another flow table (refer to Non-Patent Literature 1, "4.1.1 Pipeline Processing").

Patent Literature 1 discloses a controller equivalent to the abovementioned OFC, which performs load balancing of a service-providing server by modifying flow entries set in switches in response to a request for load balancing from the service-providing server that provides a service to a client terminal.

Patent Literature 2 discloses a managing computer by which it is possible to curtail entry overflow in a plurality of switches disposed in a communication network. In the publication, there is a description that a managing computer refers to parameters (entry state information) depending on the number of used entries of respective switches, to calculate end-to-end switch cost, and to determine a path with minimum switch cost as a flow path.

PATENT LITERATURE (PTL)

[PTL 1]
Japanese Patent Kokai Publication No. JP2011-170718A
[PTL 2]
Japanese Patent Kokai Publication No. JP2010-161473A

NON PATENT LITERATURE (NPL)

[NPL 1] "OpenFlow Switch Specification" Version 1.1.0. Implemented (Wire Protocol 0x02), [online], [Searched on Mar. 14, 2012], Internet <URL:http://www.openflow.org/documents/openflow-spec-v1.1.0.pdf>

SUMMARY

The following analysis is given according to the present invention. In OpenFlow as described above, basically one or more entries are created for one flow, to control an OFS. As a result, there is a problem in that, when there is an increase in communications for control, flow entries set in individual OFSs increase, and the performance of the OFS is affected. Here, a "flow" is a unit handled in communication in a centrally controlled network such as OpenFlow or the like.

For example, in a case where many clients are communicating with one server via an OpenFlow network, communication occurs from one address to many addresses. In such a case, as shown in flow entries #1 and #2 in FIG. 11, it is necessary to have flow entries in accordance with the number of combinations of transmission source addresses and destination addresses.

As shown in FIG. 12, even with communication between the same addresses, it may be desired to distinguish flows according to VLAN ID, VLAN Priority, IP protocol number, IP ToS, or the like (refer to FIG. 10), and to change processing content. In such a case, the number of flow entries may further increase.

With regard to this point, Non-Patent Literature 1 only describes a method of rewriting a packet header by an entry of a certain flow table using pipeline processing and then searching in the next flow table for the relevant entry with the rewritten header.

It is an object of the present invention to provide a control apparatus, a communication system, a switch control method and a program, where it is possible to curtail an increase in the number of flow entries set in individual switches, even when there is an increase in communications for control.

According to a first aspect there is provided a control apparatus, connected to a switch provided with a function to process packets by sequentially referring to a plurality of flow tables having priorities, the control apparatus including an entry generation unit that generates entry information to be set in each of a first flow table having predetermined item(s) as match conditions among information that can be set as match conditions, and a second flow table that has item(s), as match conditions, that are different from the first flow table, and that is referred to when an entry of the first flow table is hit; an entry operation unit that instructs the switch to update the first and second flow tables based on the generated entry information; and an entry management unit that manages content of each flow table of the switch.

According to a second aspect there is provided a communication system including a switch provided with a function to process packets by sequentially referring to a plurality of flow tables having priorities; and a control apparatus including an entry generation unit that generates entry information to be set in each of a first flow table having predetermined item(s) as match conditions among information that can be set as match conditions, and a second flow table that has item(s), as match conditions, that are different from the first flow table, and that is referred to when an entry of the first flow table is hit; an entry operation unit that instructs the switch to update the first and second flow tables, based on the generated entry information; and an entry management unit that manages content of each flow table of the switch.

According to a third aspect there is provided a switch control method including generating entry information to be set in each of a first flow table having predetermined item(s) as match conditions among information that can be set as match conditions, and a second flow table that has item(s), as match conditions, that are different from the first flow table, and that is referred to when an entry of the first flow table is hit; and instructing a switch provided with a function to process packets by sequentially referring to a plurality of flow tables having priorities, to update the first and second flow tables, based on the generated entry information. This method is associated with a particular machine known as a control apparatus that controls switches provided with a function to process packets by sequentially referring to a plurality of flow tables that have priorities.

According to a fourth aspect there is provided a program that executes, in a computer that controls a switch provided with a function to process packets by sequentially referring to a plurality of flow tables having priorities, a process of generating entry information to be set in each of a first flow table having predetermined item(s) as match conditions among information that can be set as match conditions, and a second flow table that has item(s), as match conditions, that are different from the first flow table, and that is referred to when an entry of the first flow table is hit; and a process of instructing a switch provided with a function to process packets by sequentially referring to a plurality of flow tables having priorities, to update the first and second flow tables, based on the generated entry information. It is to be noted that this program may be recorded on a computer-readable (non-transient) storage medium. That is, the present invention may be embodied as a computer program product.

The meritorious effects of the present invention are summarized as follows.

According to the present disclosure, it is possible to curtail an increase in the number of flow entries set in individual switches, even when there is an increase in communications for control.

BRIEF DESCRIPTION OF DRAWINGS

FIG. 5 is an example of an assumed entry generated in step S102 of FIG. 4.

FIG. 6 is an example of an entry finally set in the OFS.

FIG. 7 is a diagram for describing an effect of the present exemplary embodiment.

FIG. 8 is a diagram for describing an effect of the present exemplary embodiment.

FIG. 10 is a diagram showing information that can be used as a match condition in OpenFlow of Non-Patent Literature 1.

FIG. 11 is a diagram showing a setting example of flow entries in OpenFlow in Non-Patent Literature 1.

FIG. 12 is another diagram showing a setting example of flow entries in OpenFlow in Non-Patent Literature 1.

PREFERRED MODES

Figure 1:
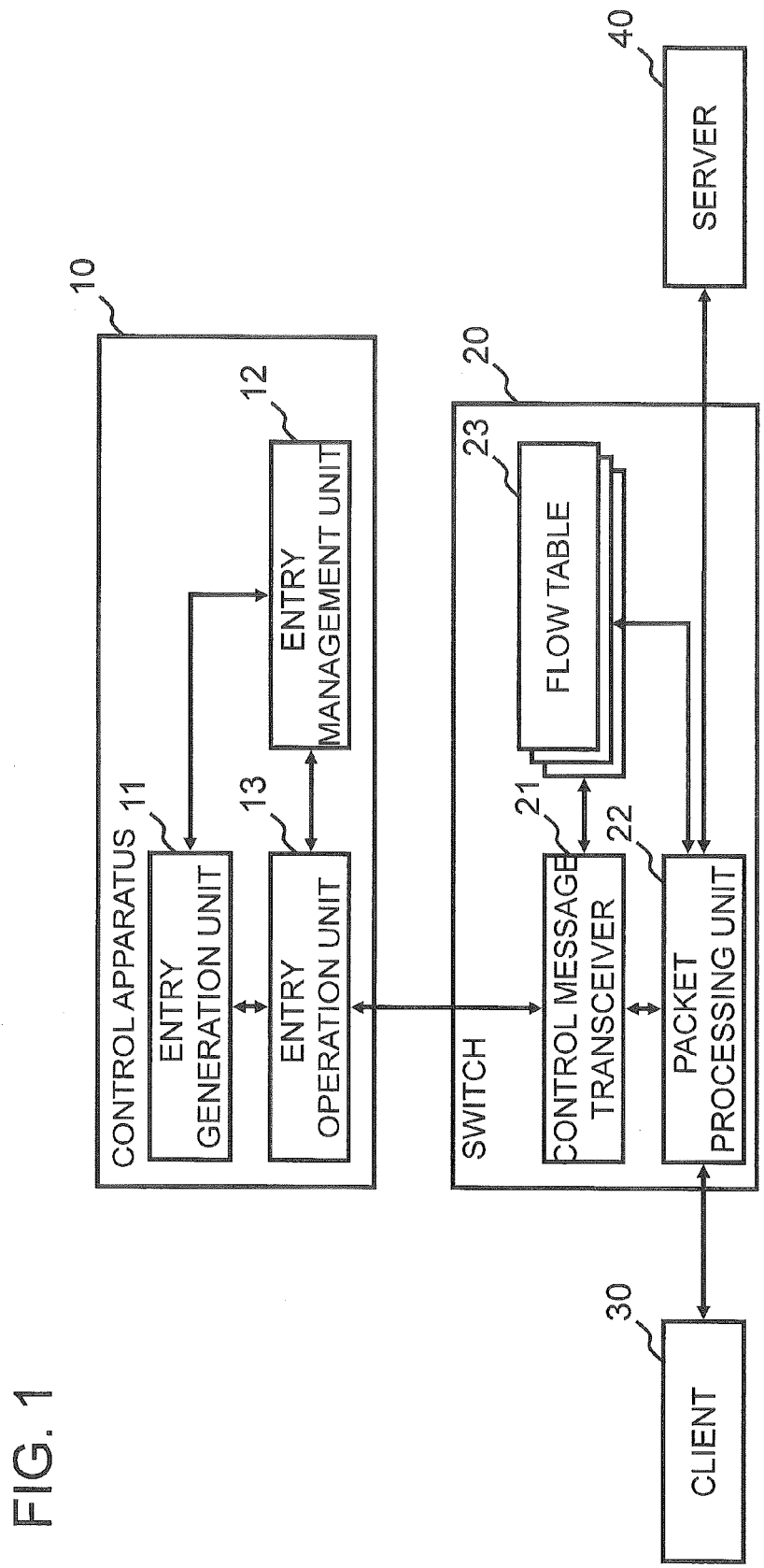
FIG. 1 is a diagram showing a configuration of an exemplary embodiment of the present disclosure.

First, a description is given of an outline of an exemplary embodiment of the present disclosure, making reference to the drawings. It is to be noted that reference symbols in the drawings attached to this outline are added to respective elements for convenience, as examples in order to aid understanding, and are not intended to limit the present disclosure to modes illustrated in the drawings.

The present disclosure, as shown in FIG. 1 in an exemplary embodiment thereof, may be realized by a configuration including a switch 20 provided with a function (packet processing unit 22) to process packets by sequentially referring to a plurality of flow tables 23 that have priorities, and a control apparatus 10 that implements communication between a client 30 and a server 40 by controlling the switch 20 via a control message transceiver 21.

More specifically, the control apparatus 10 is provided with an entry generation unit 11 that generates entry information to be set in each of a first flow table that has, as match conditions, predetermined item(s) among information that can be set as match conditions, and a second flow table that has, as match conditions, item(s) that are different from the first flow table, and that is referred to when an entry of the first flow table is hit; an entry operation unit 13 that instructs the switch 20 to update the first and second flow tables based on the generated entry information; and an entry management unit 12 that manages content of each flow table of the switch 20.

According to the present disclosure as described above, control can be performed with regard to M N flows (M and N are natural numbers) representing combinations of match conditions, with M entries recorded in the first flow table and N entries recorded in the second flow table designated as references by the M entries.

First Exemplary Embodiment

Figure 2:
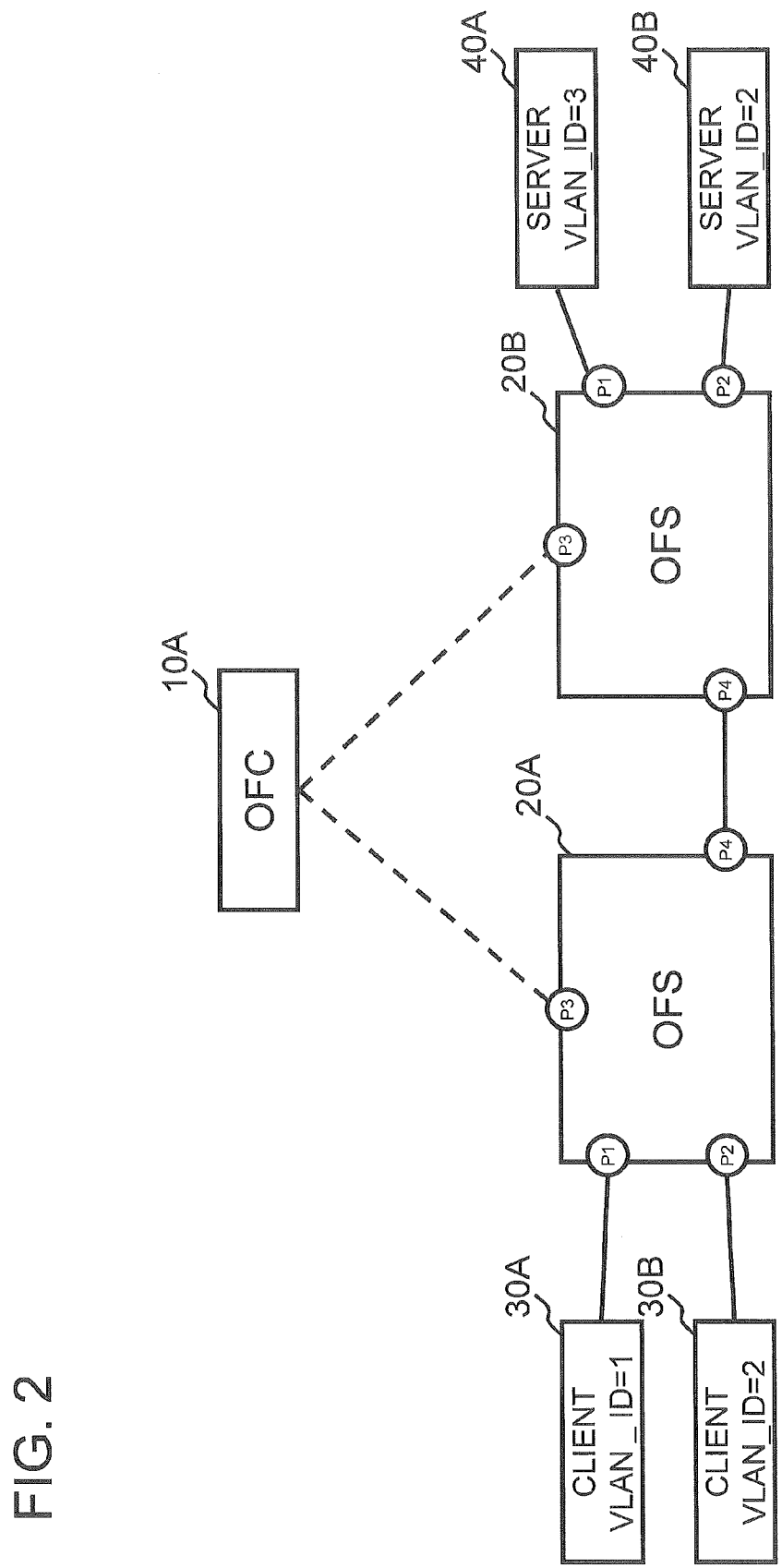
FIG. 2 is a diagram showing a configuration of a communication system in a first exemplary embodiment of the present disclosure.

Next, a detailed description is given concerning a first exemplary embodiment of the present disclosure, making reference to the drawings. FIG. 2 is a diagram showing a configuration of a communication system in the first exemplary embodiment of the present disclosure. FIG. 2 shows a network configured by two OFSs 20A and 20B, an OFC 10A that controls the OFSs 20A and 20B, clients 30A and 30B that communicate via the OFSs 20A and 20B, and two servers 40A and 40B.

In the example of FIG. 2, the OFS 20A has four ports P1 to P4; client 30A is connected to port P1, and client 30B is connected to port P2. The OFS 20B has four ports P1 to P4; server 40A is connected to port P1, and server 40B 30B is connected to port P2. Ports P3 of the OFSs 20A and 20B are used as connection ports to the OFC 10A. In addition, the OFSs•20A and 20B are connected by respective ports P4.

The clients 30A and 30B are information processing devices such as a personal computer, a mobile telephone or the like. In the description below, VLAN ID=1 is set for the client 30A, and VLAN ID=2 is set the client 30B.

The servers 40A and 40B are information processing devices that provide various types of service to the clients 30A and 30B. In the description below, VLAN ID=3 is set for the server 40A, and VLAN ID=2 for set for the server 40B.

Figure 3:
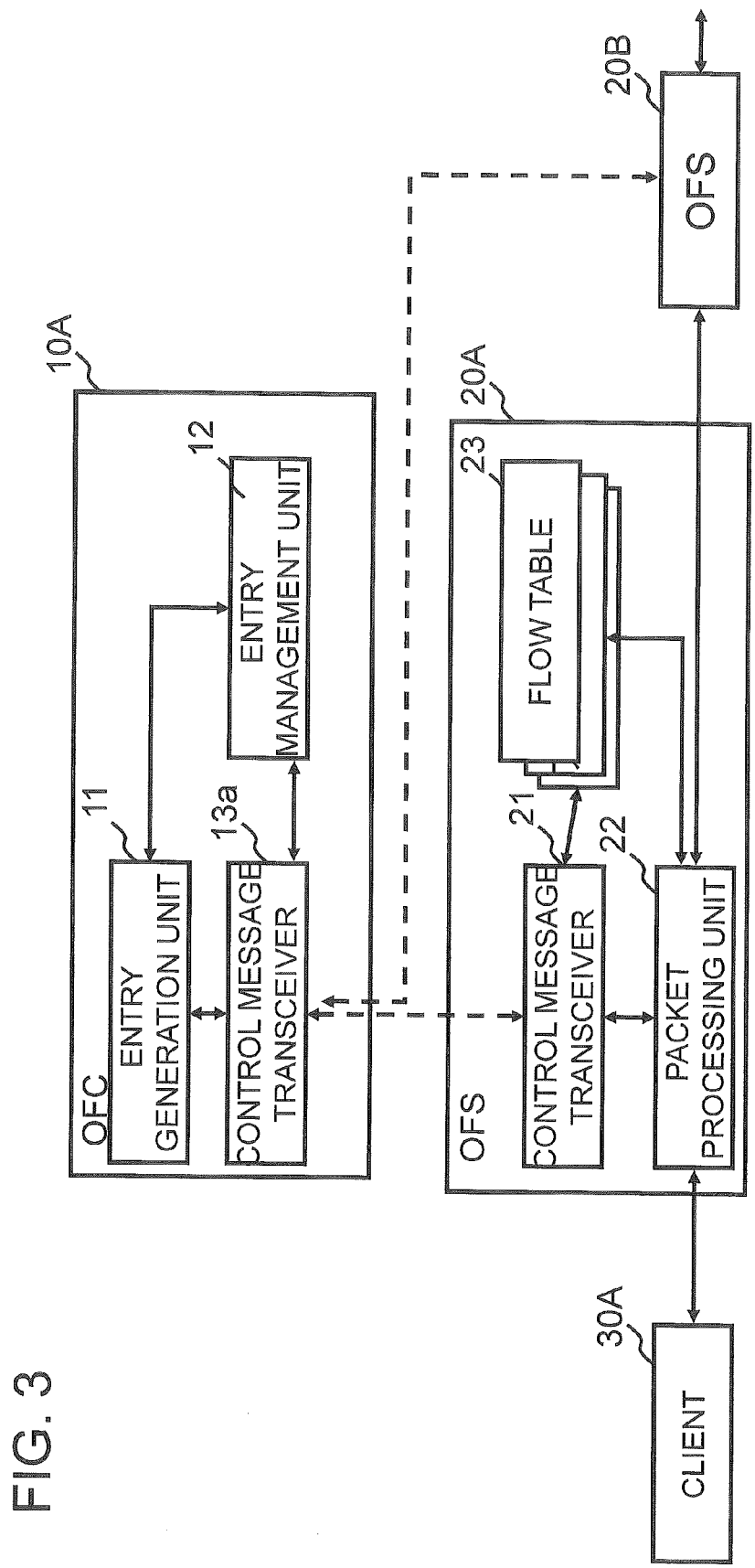
FIG. 3 is a diagram showing a detailed configuration of an OFC and an OFS in the first exemplary embodiment of the present disclosure.

FIG. 3 is a diagram showing detailed OFC and OFS configurations. FIG. 3 shows the OFC 10A that is provided with an entry generation unit 11, and entry management unit 12, and a control message transceiver 13*a*; and the OFS 20A that is provided with a control message transceiver 21, a packet processing unit 22, and a plurality of flow tables 23. It is to be noted that since the OFS 20B has the same configuration as the OFS 20A, a description thereof is omitted.

On receiving a new flow detection notification (Packet-In message) from the OFS 20A or 20B via the control message transceiver 13*a*, in order to forward the packet in question on a prescribed path, the entry generation unit 11 of the OFC 10A generates an entry to be set in the OFSs 20A and 20B on the path. It is to be noted that the forwarding path of the packet can be calculated by referring to network topology or user access policy, which are omitted from the drawings. A detailed description is given later of an entry generated by the entry generation unit 11, using the drawings.

The entry management unit 12 stores and manages content the same as entries set in the flow tables 23 of the OFSs 20A and 20B. Specifically, the entry management unit 12 may apply content similar to operation content of a flow table by the control message transceiver 13*a*, to the flow tables of the OFSs 20A and 20B stored therein. Setting information is also stored, in the entry management unit 12, which determines item(s) to be used as match conditions by a first flow table, and item(s) to be used as match conditions by a second flow table, decided in advance for each OFS or each flow.

The control message transceiver 13*a* corresponds to the entry operation unit described above, and performs an operation (newly record, modify, delete, etc.) on an entry stored in a flow table of the respective OFSs 20A and 20B, by transmitting a control message to the respective OFSs 20A and 20B.

It is to be noted that the OFC 10A as described above can be realized by adding a change to an entry generation function of an OFC of Non-Patent Literature 1. The respective parts (processing means) of the OFC 10A can be implemented by a computer program that executes the abovementioned respective processing on a computer configuring the OFC 10A, using hardware thereof.

The control message transceiver 21 of the OFS 20A adds a change to an entry of a flow table 23, in accordance with a control message received from the control message transceiver 13*a* of the OFC 10A.

On receiving a packet from the client 30A or the OFS 20B, the packet processing unit 22 searches for an entry having a match condition that matches the received packet, from a flow table (Table #0 in Non-Patent Literature 1) that has highest priority from among the plurality of flow tables 23, and executes processing content (Instructions) set in the relevant entry. In a case where an action (Go-to Table #N) instructing that reference be made to a specified flow table, is set in the processing content (Instructions) at this time, the packet processing unit 22 refers to the specified flow table and searches for an entry having a match condition that matches the received packet. It is to be noted that, as a result of the search, in a case where an entry having a match condition that matches the received packet is not found, the packet processing unit 22 transmits a new flow detection notification (Packet-In message) to the OFC 10A via the control message transceiver 21.

The plurality of flow tables 23, as shown in FIG. 6, are configured by a plurality of flow tables (Table #0, Table #1). In the example of FIG. 6, Table #0 is the flow table with the highest priority. As a result of a search of Table #0 in FIG. 6, in a case where entry #1 of Table #0 is found as an entry having a match condition that matches an input port or header information (transmission source MAC address-destination IP address) of a received packet, a search is again performed, of Table #1, in accordance with processing content (Instructions) thereof. As a result of the search of Table #1, in a case where entry #1 of Table #0 was found as the entry having a match condition that matches a VLAN ID of the received packet, processing is performed to rewrite VLAN ID to "2", and processing is performed to output from port P4, in accordance with processing content (Instructions) thereof. As a result thereof, the received packet is forwarded to the OFS 20B that is connected to port P4. It is to be noted that in FIG. 5 to FIG. 8, a wildcard is set in a field that is not necessary for distinguishing flow, and these items are omitted.

It is to be noted that such OFSs 20A and 20B may be implemented using an OFS of Non-Patent Literature 1.

Figure 4:
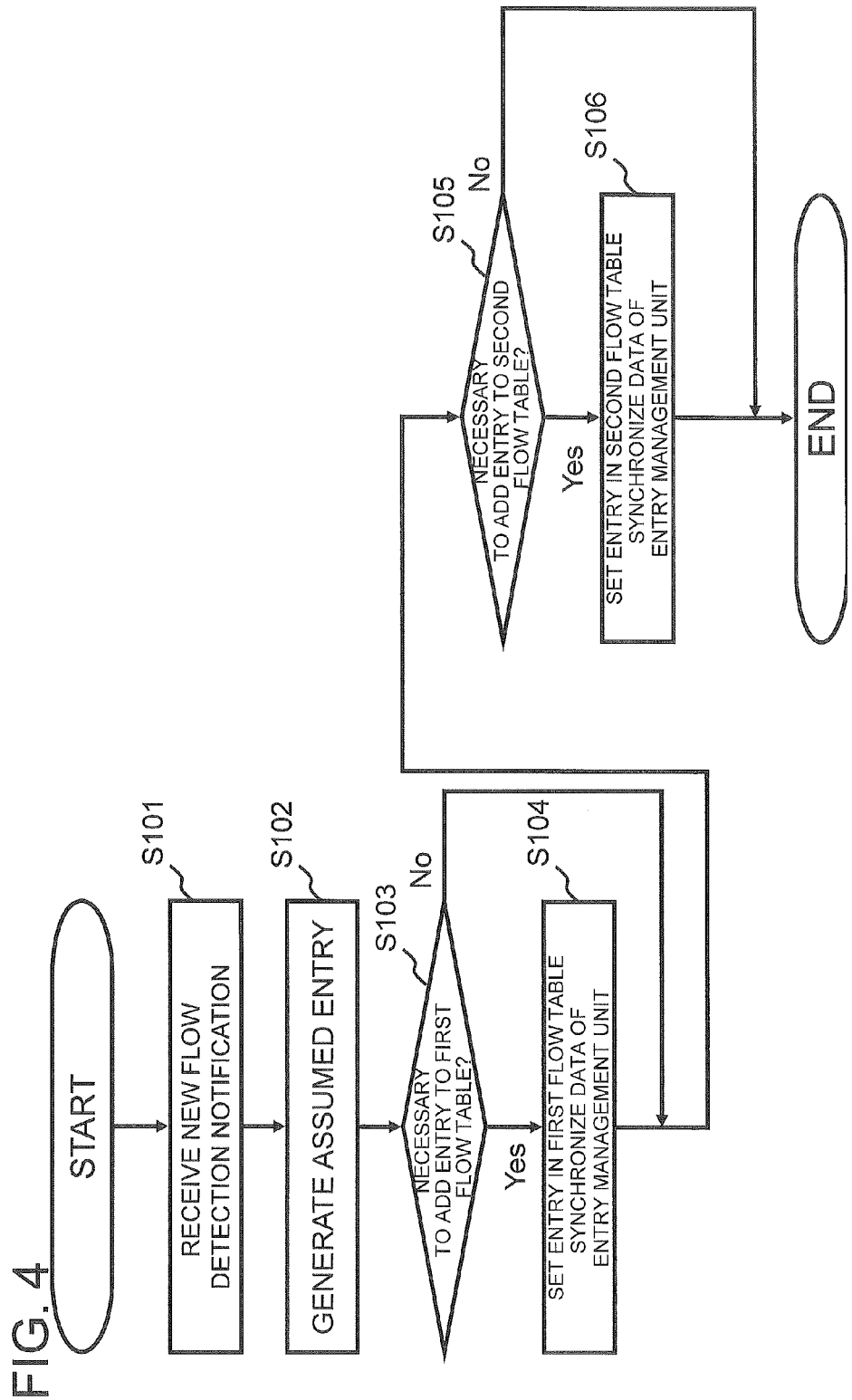
FIG. 4 is a flowchart representing operations (setting of a new entry) of the OFC in the first exemplary embodiment of the present disclosure.

Next, a detailed description is given concerning operations of the present exemplary embodiment, making reference to the drawings. FIG. 4 is a flowchart representing operations (setting of a new entry) of the OFC in the first exemplary embodiment of the present disclosure. In the following, a description is given citing an example in which the client 30A of FIG. 2 transmits a packet to the server 40B. The MAC address of the client 30A is "00:00:00:00:0A:01", and the IP address is "10.0.0.1". The MAC address of the server 40B is "00:00:00:00:0B:01", and the IP address is "10.0.0.2".

Referring to FIG. 4, as a result of the search of the flow tables 23, since a relevant entry does not exist, the OFS 20A that receives a packet addressed to the server 40B from the client 30A transmits a new flow detection notification (Packet-In message) to the OFC 10A. On receiving the new flow detection notification (Packet-In message) from the OFS 20A or the OFS 20B (step S101), the OFC 10A uses information of the received packet included in the new flow detection notification (Packet-In message) to generate an assumed entry in order to process packet(s) following after the packet in question (step S102).

FIG. 5 is a diagram showing an assumed entry generated in step S102. Since the OFS 20A receives the packet addressed to the server 40B from the client 30A at port P1, with an input port P1 (below, in the flow tables, P1 to P4 are respectively denoted 1, 2, 3 and 4), and the MAC address and IP address of the client 30A and the server 40B as match conditions, an entry is generated with processing content (Instructions) in which VLAN ID is rewritten (VLAN ID=1→2) and is forwarded to the OFS 20B (forwarding from port P4).

Next, the OFC 10A starts processing to decompose the generated assumed entry into entries set in two flow tables of the OFS 20A. First, the OFC 10A confirms whether or not there is recorded in the first flow table (Table #0) of the OFS 20A an entry having the same match conditions as the input port-destination IP address, among match conditions of the generated assumed entry, by referring to the entry management unit 12 (step S103).

At this point in time, since there is no entry set that has a MAC address and IP address of the client 30A and the server 40B as match conditions, the OFC 10A refers to setting information of the entry management unit 12, and as shown in the upper part of FIG. 6, generates and sets in the OFS 20A an entry instructing that reference be made to the second flow table (Table #1), with input port=P1, and MAC address and IP address of the client 30A and the server 40B as match conditions (step S104). The OFC 10A also records the entry set in the OFS 20A in its own entry management unit 12. It is to be noted that, although omitted in FIG. 6, wild cards treated as matching any value are set in fields that are not necessary for distinguishing flows in respective entries.

Next, by making reference to the entry management unit 12, the OFC 10A confirms whether or not an entry having a combination of processing content and match conditions remaining in the generated assumed entry is recorded in the second flow table (Table #1) of the OFS 20A (step S105).

At this point in time, since there is no entry set that has processing content which, as a match condition of VLAN ID being 1, rewrites the VLAN ID to 2 and forwards from port P4, the OFC 10A generates and sets in the OFS 20A an entry having processing content (Instructions) which, with VLAN ID=1 as a match condition, rewrites the VLAN ID and forwards from port P4 (step S106). The OFC 10A also records the entry set in the OFS 20A in its own entry management unit 12.

The assumed entry generated in step S102 in this way is decomposed into two entries and set, as shown in FIG. 6.

Thereafter, even if a packet with a different VLAN ID is transmitted with a destination of the server 40B from the client 30A, for example, the OFC 10A generates and sets only an entry necessary for the first and second flow tables, in accordance with the flow shown in FIG. 6.

Continuing, a description is given concerning an effect of the present exemplary embodiment. In a case where the VLAN IDs of packets that may be received by the OFS 20A have 10 patterns, 1 to 10, and the transmission source MAC addresses have 10 patterns: 00:00:00:00:0A:01, 00:00:00:00:0A:02, 00:00:00:00:0A:03-00:00:00:00:0A:0A, in step S102 of FIG. 4, entries of 100 patterns are generated as shown in FIG. 7.

However, in the present exemplary embodiment, since processing is performed to decompose entries as shown in steps S103 to S106 in FIG. 4, entries set in OFS 20A are aggregated into 10+10=20 patterns, as shown in FIG. 8.

Figure 9:
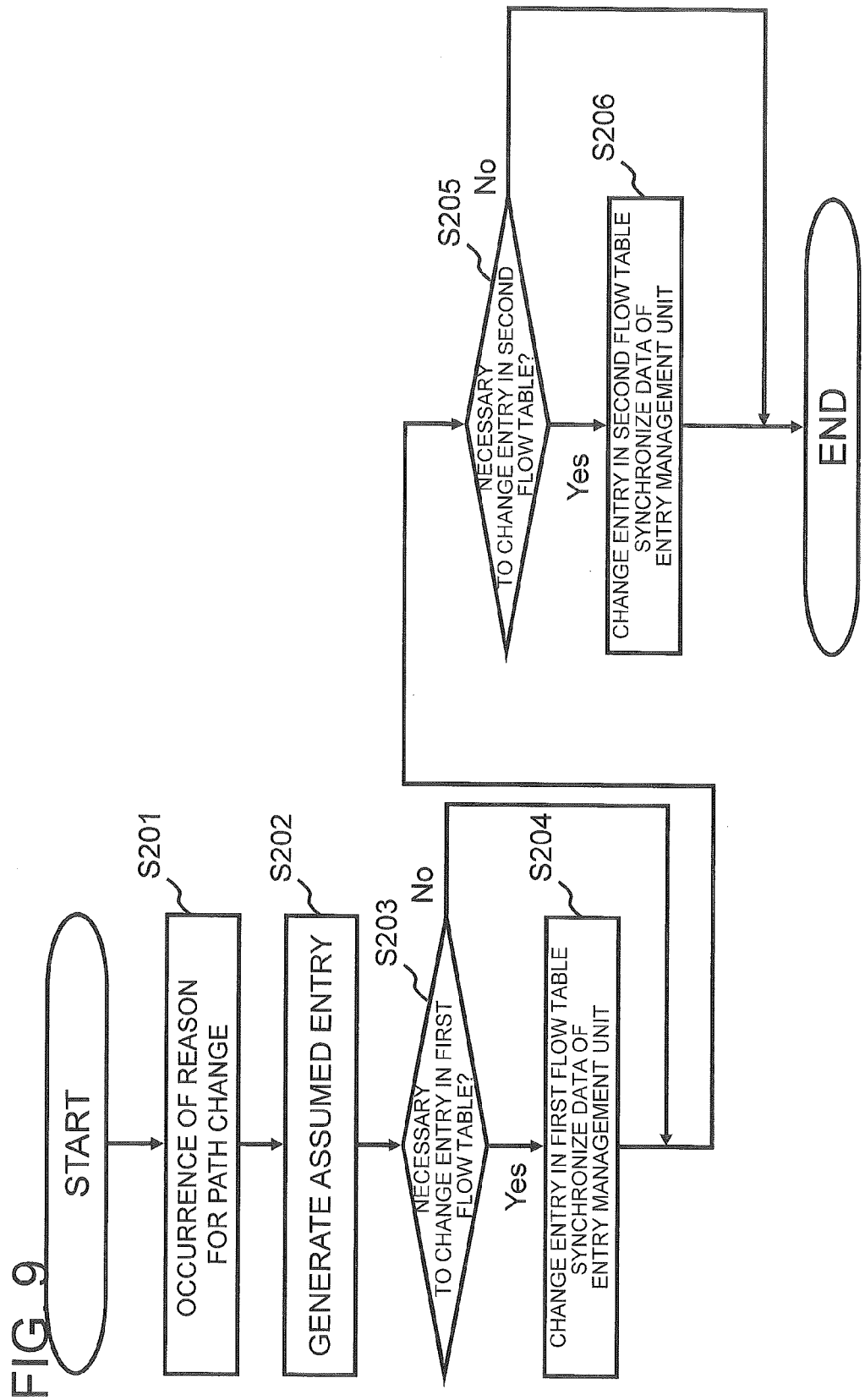
FIG. 9 is a flowchart representing operations (change of an existing entry) of the OFC in the first exemplary embodiment of the present disclosure.

According to the present exemplary embodiment, the number of entries to be processed is reduced also at a time of flow change. FIG. 9 is a flowchart representing operations (change of an existing entry) of the OFC when a reason occurs for a path change, such as the failure of an OFS or a server. When a reason for a path change occurs, the OFC 10A generates an assumed entry to implement a post-change packet forwarding path, similar to when setting a new entry. In the same way as in S103 to S106 of the flowchart in FIG. 4, updating is performed for each of the first and second flow tables.

In this way, for example, in a case where a failure occurs in the server 40B of FIG. 2 and it is desired to switch to the server 40A, it is necessary to change the VLAN ID rewrite field to 3 in the processing content (Instructions) of FIG. 7. In a case of performing a change to a flow table of FIG. 7 as it is, it is necessary to change 100 entries, but if the flow of FIG. 9 is applied, since it is determined that change to the first flow table is not necessary in step 203, it is enough to rewrite 10 entries in the second table.

A description has been given above of exemplary embodiments of the present invention, but the present invention is not limited to the abovementioned exemplary embodiments, and changes, substitutions and adjustments may be added within a scope that does not depart from fundamental technical concepts of the invention. For example, there is no limitation with regard to the network configuration or the number of clients or servers used in the exemplary embodiments described above.

In the abovementioned exemplary embodiment, a description has been given citing examples in which an assumed entry is decomposed into two flow tables, but according to configuration of setting information stored in the entry management unit 12, it is possible to perform decomposition into 3 or more flow tables. For example, it is possible to decompose the first flow table (Table #0) of FIG. 6 and FIG. 8 into a flow table with a transmission source address as a match condition, and a flow table with a destination address as a match condition.

Furthermore it is possible to add various transformations to decomposition patterns of the flow tables cited in the exemplary embodiments described above. For example, as match conditions, values may be added to other fields shown in FIG. 10, or may be deleted. Clearly, some match conditions of the first flow table may be moved to match conditions of the second flow table.

It is to be noted that the various disclosures of the abovementioned Patent Literature and Non-Patent Literature are incorporated herein by reference thereto. Modifications and adjustments of exemplary embodiments and examples may be made within the bounds of the entire disclosure (including the scope of the claims) of the present invention, and also based on fundamental technological concepts thereof. Furthermore, various combinations and selections of various disclosed elements (including respective elements of the respective claims, respective elements of the respective exemplary embodiments and examples, respective elements of the respective drawings, and the like) are possible within the scope of the claims of the present invention. That is, the present invention clearly includes every type of transformation and modification that a person skilled in the art can realize according to the entire disclosure including the scope of the claims and to technological concepts thereof.

REFERENCE SIGNS LIST 10 control apparatus
10A OFC (OpenFlow controller)
11 entry generation unit
12 entry management unit
13 entry operation unit
13a control message transceiver
20 switch
20A, 20B OFS (OpenFlow switch)
21 control message transceiver
22 packet processing unit
23 flow table
30, 30A, 30B client
40, 40A, 40B server

What is claimed is:

1. A control apparatus, connected to a switch provided with a function to process packets by sequentially referring to a plurality of flow tables having priorities, the control apparatus comprising:
   a processor configured to execute program instructions to:
   generate entry information to be set in each of a first flow table having predetermined item(s) as match conditions among information that is configured to be set as match conditions, and a second flow table that has item(s), as match conditions, that are different from the first flow table, and that is referred to when an entry of the first flow table is hit;
   instruct the switch to update the first flow table and the second flow table, based on the generated entry information; and
   manage content of the first flow table and the second flow table of the switch.

2. The control apparatus according to claim 1, wherein
   said entry generation unit additionally determines change content of said first and second flow tables by referring to said entry management unit when a necessity occurs to change an existing flow, and
   said entry operation unit instructs said switch to update said first and second flow tables, based on said determined change content.

3. The control apparatus according to claim 2, wherein, according to M entries stored in said first flow table and N entries stored in said second flow table, said control apparatus controls M N flows that have different match conditions, by M+N entries.

4. The control apparatus according to claim 2, wherein
   said entry management unit stores setting information determining item(s) to be used as match conditions by a first flow table, and item(s) to be used as match conditions by a second flow table, decided in advance, and
   said entry generation unit, after generating an assumed entry having a match condition for distinguishing a packet requested by said switch, refers to said setting information, decomposes said match condition, and generates entry information to be set in said first and second flow tables.

5. The control apparatus according to claim 2, wherein
   said entry generation unit additionally generates entry information to be set in a third flow table that has item(s), as match conditions, that are different from said second flow table, and that is referred to when an entry of said second flow table is hit, and
   said entry operation unit instructs said switch to update said first to third flow tables, based on said generated entry information.

6. The control apparatus according to claim 1, wherein, according to M entries stored in said first flow table and N entries stored in said second flow table, said control apparatus controls M N flows that have different match conditions, by M+N entries.

7. The control apparatus according to claim 6, wherein
   said entry management unit stores setting information determining item(s) to be used as match conditions by a first flow table, and item(s) to be used as match conditions by a second flow table, decided in advance, and
   said entry generation unit, after generating an assumed entry having a match condition for distinguishing a packet requested by said switch, refers to said setting information, decomposes said match condition, and generates entry information to be set in said first and second flow tables.

8. The control apparatus according to claim 6, wherein
   said entry generation unit additionally generates entry information to be set in a third flow table that has item(s), as match conditions, that are different from said second flow table, and that is referred to when an entry of said second flow table is hit, and
   said entry operation unit instructs said switch to update said first to third flow tables, based on said generated entry information.

9. The control apparatus according to claim 1, wherein
   said entry management unit stores setting information determining item(s) to be used as match conditions by a first flow table, and item(s) to be used as match conditions by a second flow table, decided in advance, and
   said entry generation unit, after generating an assumed entry having a match condition for distinguishing a packet requested by said switch, refers to said setting information, decomposes said match condition, and generates entry information to be set in said first and second flow tables.

10. The control apparatus according to claim 9, wherein
    said entry generation unit additionally generates entry information to be set in a third flow table that has item(s), as match conditions, that are different from said second flow table, and that is referred to when an entry of said second flow table is hit, and
    said entry operation unit instructs said switch to update said first to third flow tables, based on said generated entry information.

11. The control apparatus according to claim 1, wherein
    said entry generation unit additionally generates entry information to be set in a third flow table that has item(s), as match conditions, that are different from said second flow table, and that is referred to when an entry of said second flow table is hit, and
    said entry operation unit instructs said switch to update said first to third flow tables, based on said generated entry information.

12. The control apparatus according to claim 1, wherein the switch comprises the plurality of flow tables including the first and second flow tables that have priorities, and
    wherein the switch comprises the second flow table that is referred to by the entry generation unit when an entry of the first flow table is hit.

13. A communication system, comprising:
    a switch provided with a function to process packets by sequentially referring to a plurality of flow tables having priorities; and
    a control apparatus connected to the switch, comprising:
    a processor configured to execute program instructions to:
    generate entry information to be set in each of a first flow table having predetermined item(s) as match conditions among information that is configured to be set as match conditions, and a second flow table that has item(s), as match conditions, that are different from said first flow table, and that is referred to when an entry of said first flow table is hit;
    instruct said switch to update said first and second flow tables, based on said generated entry information; and
    manage content of each flow table of said switch.

14. The communication system according to claim 13, wherein, according to M entries stored in said first flow table and N entries stored in said second flow table, said control apparatus controls M N flows that have different match conditions, by M+N entries.

15. The communication system according to claim 13, wherein when generating, said processor stores setting information that determines item(s) to be used as match conditions by a first flow table, and item(s) to be used as match conditions by a second flow table, decided in advance, and when managing, said processor, after generating an assumed entry having a match condition for distinguishing a packet requested from said switch, refers to said setting information, decomposes said match condition, and generates entry information to be set in said first and second flow tables.

16. The communication system according to claim 13, wherein the switch comprises the plurality of flow tables that have priorities, and wherein the switch comprises the first flow table, and the second flow table that is referred to when an entry of the first flow table is hit.

17. The communication system according to claim 13, wherein the switch comprises a single switch comprising the plurality of flow tables including the first and second flow tables that have priorities, and wherein the single switch comprises the first flow table, and the second flow table that is referred to when an entry of the first flow table is hit.

18. A switch control method, comprising:

generating entry information, by a processor, to be set in each of a first flow table having predetermined item(s) as match conditions among information that is configured to be set as match conditions, and a second flow table that has item(s), as match conditions, that are different from said first flow table, and that is referred to when an entry of said first flow table is hit, and instructing, by the processor, a switch provided with a function to process packets by sequentially referring to a plurality of flow tables having priorities, to update said first and second flow tables, based on said generated entry information, and managing content, by the processor, of each flow table of said switch.

19. The switch control method according to claim 18, wherein the switch comprises the plurality of flow tables including the first and second flow tables that have priorities, and wherein the switch comprises the first flow table, and the second flow table that is referred to when an entry of the first flow table is hit.

20. A non-transitory computer-readable storage medium storing a program that executes, in a computer that controls a switch provided with a function to process packets by sequentially referring to a plurality of flow tables having priorities:

a process of generating entry information to be set in each of a first flow table having predetermined item(s) as match conditions among information that can be set as match conditions, and a second flow table that has item(s), as match conditions, that are different from said first flow table, and that is referred to when an entry of said first flow table is hit, and a process of instructing a switch provided with a function to process packets by sequentially referring to a plurality of flow tables having priorities, to update said first and second flow tables, based on said generated entry information.

* * * * *